(12) United States Patent
Kang et al.

(10) Patent No.: US 9,422,920 B2
(45) Date of Patent: Aug. 23, 2016

(54) HIGH-ALTITUDE WIND POWER GENERATION SYSTEM WITH CYCLOIDAL TURBINE AND MOTOR-GENERATOR, AND METHOD OF OPERATING THE SAME

(71) Applicant: KOREA AEROSPACE RESEARCH INSTITUTE, Daejeon (KR)

(72) Inventors: Wang Gu Kang, Daejeon (KR); In Seong Hwang, Daejeon (KR); Seung Jo Kim, Seoul (KR)

(73) Assignee: KOREA AEROSPACE RESEARCH INSTITUTE, Daejeon (KR)

( * ) Notice: Subject to any disclaimer, the term of this patent is extended or adjusted under 35 U.S.C. 154(b) by 15 days.

(21) Appl. No.: 14/355,579

(22) PCT Filed: Oct. 22, 2012

(86) PCT No.: PCT/KR2012/008641
§ 371 (c)(1),
(2) Date: Apr. 30, 2014

(87) PCT Pub. No.: WO2013/065979
PCT Pub. Date: May 10, 2013

(65) Prior Publication Data
US 2014/0252776 A1    Sep. 11, 2014

(30) Foreign Application Priority Data

Oct. 31, 2011  (KR) .................. 10-2011-0112494

(51) Int. Cl.
*F03D 9/00* (2016.01)
*F03D 11/04* (2006.01)
*F03D 3/00* (2006.01)

(52) U.S. Cl.
CPC ............ *F03D 9/002* (2013.01); *F03D 3/002* (2013.01); *F03D 11/04* (2013.01); *F05B 2240/214* (2013.01); *F05B 2240/921* (2013.01); *Y02E 10/728* (2013.01); *Y02E 10/74* (2013.01)

(58) Field of Classification Search
CPC ... F03D 3/002; F03D 9/002; F05B 2240/214; F05B 2240/921
USPC ............ 290/44, 55; 244/153 R, 30, 33, 158.2
See application file for complete search history.

(56) References Cited

U.S. PATENT DOCUMENTS 4,659,940 A * 4/1987 Shepard .......................... 290/55
5,056,447 A * 10/1991 Labrador .................... 114/39.26

(Continued)

FOREIGN PATENT DOCUMENTS

EP        391601 A2 * 10/1990 ............. F03D 11/04
JP      S55-125368 A    9/1980

(Continued)

*Primary Examiner* — Julio Gonzalez Ramirez
(74) *Attorney, Agent, or Firm* — Rabin & Berdo, P.C.

(57) ABSTRACT

A high-altitude wind power generation system with a cycloidal turbine and a motor-generator, and a method of operating the same. The system includes a buoyant apparatus configured to be inflated when buoyancy generating gas is injected therein; a cycloidal turbine configured to be placed under the buoyant apparatus, and comprise a rotary shaft arranged to be substantially horizontal to the ground, and a plurality of blades arranged along a circumferential direction of the rotary shaft while their pitch center lines are long extended to be parallel with a center line of the rotary shaft and are spaced apart from the rotary shaft at a preset distance as being arranged to be substantially perpendicular to a flowing direction of fluid blowing from a front, having pitch angles individually adjustable with respect to the pitch center line; and a motor-generator configured to connect with the rotary shaft of the cycloidal turbine.

8 Claims, 4 Drawing Sheets

(56) References Cited

U.S. PATENT DOCUMENTS

| | | | |
|---|---|---|---|
| 2006/0091678 A1* | 5/2006 | Macedo | 290/55 |
| 2008/0296905 A1* | 12/2008 | Ferguson | 290/55 |
| 2009/0294575 A1* | 12/2009 | Chu | 244/30 |
| 2010/0230968 A1* | 9/2010 | Chernyshov | 290/44 |
| 2010/0295303 A1* | 11/2010 | Lind et al. | 290/44 |
| 2012/0248770 A1* | 10/2012 | Byun | 290/44 |
| 2013/0241208 A1* | 9/2013 | Zanetti | 290/55 |
| 2013/0285385 A1* | 10/2013 | Zohar | 290/55 |
| 2014/0062094 A1* | 3/2014 | Chan | 290/55 |
| 2014/0246862 A1* | 9/2014 | Garcia-Sanz et al. | 290/55 |

FOREIGN PATENT DOCUMENTS

| | | |
|---|---|---|
| KR | 10-2009-0005120 A | 1/2009 |
| KR | 10-2009-0030519 A | 3/2009 |
| KR | 10-0886214 B1 | 3/2009 |
| KR | 10-2010-0070532 A | 6/2010 |
| KR | 10-2011-0108485 A | 10/2011 |
| WO | WO 2010148373 A1 * | 12/2010 |

\* cited by examiner

HIGH-ALTITUDE WIND POWER GENERATION SYSTEM WITH CYCLOIDAL TURBINE AND MOTOR-GENERATOR, AND METHOD OF OPERATING THE SAME

TECHNICAL FIELD

The present invention relates to a high-altitude wind power generation system, and more particularly to a high-altitude wind power generation system which receives a turning force from a rotary shaft to generate power in a power generation mode, and transmits a driving force to the rotary shaft to generate lift or thrust in a motor mode.

BACKGROUND ART

A horizontal-shaft type system has been common in a conventional high-altitude wind power generation system, which includes a buoyant apparatus such as an aerostat or a balloon; a horizontal shaft substantially parallel with a flowing direction of fluid, i.e., winds from the front while hanging on the buoyant apparatus; and radial blades coupled to the horizontal shaft and rotating like an air vane with respect to the horizontal shaft. For example, Korean Patent Official Gazette (with publication No. 10-2011-0108485, published on Oct. 6, 2011) discloses the horizontal-shaft type wind power generation system (see FIG. 1 of the official gazette).

However, such a conventional horizontal-shaft type has to be unavoidably mounted with the blades having a large radius in order to produce power as required. Due to the blades having the large radius, the conventional horizontal-shaft type has problems that a structure for mounting the blades to the buoyant apparatus is complicated and the whole system is increased in volume and weight.

Also, the conventional horizontal-shaft type mostly has a structure that the blades are rotated at high velocity as being opened at the ends thereof, and therefore the blades having the large radius may hit the buoyant apparatus or the like danger of safety accidents may increase while the system operates at a high altitude.

DISCLOSURE

Technical Problem

The present invention is conceived to solve the foregoing problems, and an aspect of the present invention is to provide a high-altitude wind power generation system having an improved structure of receiving a turning force from a rotary shaft to generate power in a power generation mode, and transmitting a driving force to the rotary shaft to generate lift or thrust in a motor mode.

Another aspect of the present invention is to provide a method of operating the high-altitude wind power generation system.

Technical Solution

In accordance with one aspect of the present invention, there is provided a high-altitude wind power generation system, which generates power based on wind power while staying at a high altitude, the system including: a buoyant apparatus configured to be inflated when buoyancy generating gas is injected therein; a cycloidal turbine configured to be placed under the buoyant apparatus, and comprise a rotary shaft arranged to be substantially horizontal to the ground, and a plurality of blades arranged along a circumferential direction of the rotary shaft while their pitch center lines are long extended to be parallel with a center line of the rotary shaft and are spaced apart from the rotary shaft at a preset distance as being arranged to be substantially perpendicular to a flowing direction of fluid blowing from a front, having pitch angles individually adjustable with respect to the pitch center line, and rotating with respect to the rotary shaft while their pitch center lines are being parallel with the center line of the rotary shaft; and a motor-generator configured to connect with the rotary shaft of the cycloidal turbine, receive a turning force from the rotary shaft to generate power in a power generation mode, and transmit a driving force to the rotary shaft to generate lift or thrust in a motor mode.

The cycloidal turbine may include a pair of support hubs spaced apart from each other, having respective center portions irrotationally coupled to opposite ends of the rotary shaft, and including a plurality of radial spokes extended in a radial direction of the rotary shaft, so that opposite ends of the blade can be respectively rotatably supported at ends of the radial spokes.

The buoyant apparatus may include a buoyant parafoil having a cross-section shaped like an airfoil when inflated.

The system may connect with a first end of a mooring wire having a second end fastened to the ground so as to stay at a preset altitude and position.

The mooring wire may be adjusted in length by a ground winch fastened to the ground.

In accordance with one aspect of the present invention, there is provided a method of operating the foregoing high-altitude wind power generation system, the method including: a buoyancy generating gas injecting step of inflating the buoyant apparatus by injecting the buoyancy generating gas therein; a buoyancy and lift securing step of securing buoyancy generated by the buoyant apparatus and aerodynamic lift generated by the buoyant apparatus; a high-altitude placement step of placing the buoyant apparatus at a preset altitude and position; and a wind power generation step of generating electricity by operating the motor-generator in the power generation mode.

In the buoyancy and lift securing step, the motor-generator operates in the motor mode, so that the cycloidal turbine can generate the additional lift.

The wind power generation step is performed only when velocity of winds blowing from a front is higher than a preset wind velocity, and the method may further include: an altitude maintaining step of using the motor generator in the motor mode when the velocity of the winds W blowing from the front is lower than the preset wind velocity, so that the cycloidal turbine can generate the additional lift.

Advantageous Effects

Embodiments of the present invention have effects on providing a high-altitude wind power generation system which includes a cycloidal turbine which has a rotary shaft arranged to be substantially horizontal to the ground G, and a plurality of blades rotating with respect to the rotary shaft while their pitch center lines are parallel with a center line of the rotary shaft; and a motor-generator connected to the rotary shaft of the cycloidal turbine, thereby having an improved structure of receiving a turning force from a rotary shaft to generate power in a power generation mode, and transmitting a driving force to the rotary shaft to generate lift or thrust in a motor mode.

BEST MODE

Embodiments of the present invention will be described in detail with reference to the accompanying drawings.

Figure 1:
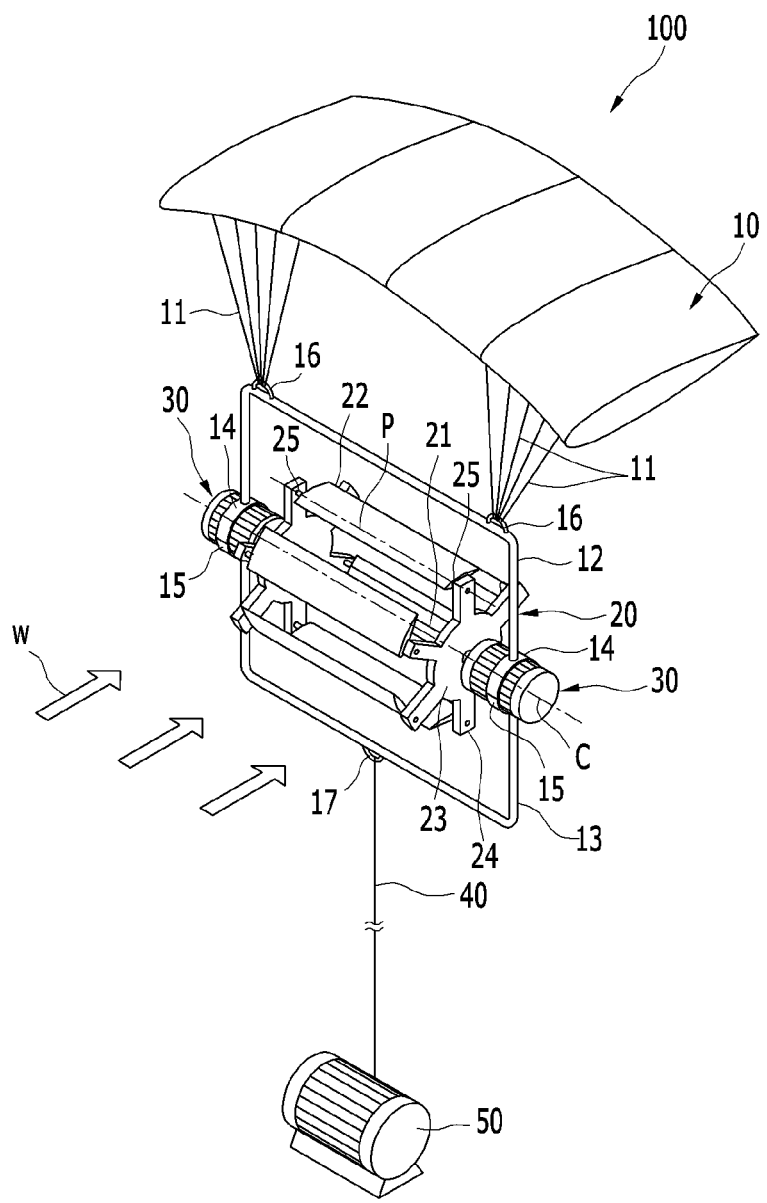
FIG. 1 is a perspective view of a high-altitude wind power generation system according to an embodiment of the present invention.
Figure 2:
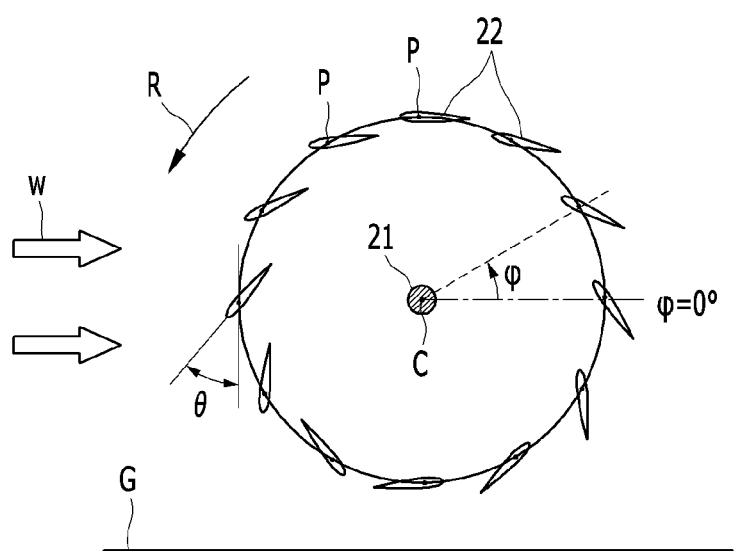
FIG. 2 is a view showing that a pitch angle is adjusted in accordance with a phase angle of the blades shown in FIG. 1, in a power generation mode.
Figure 3:
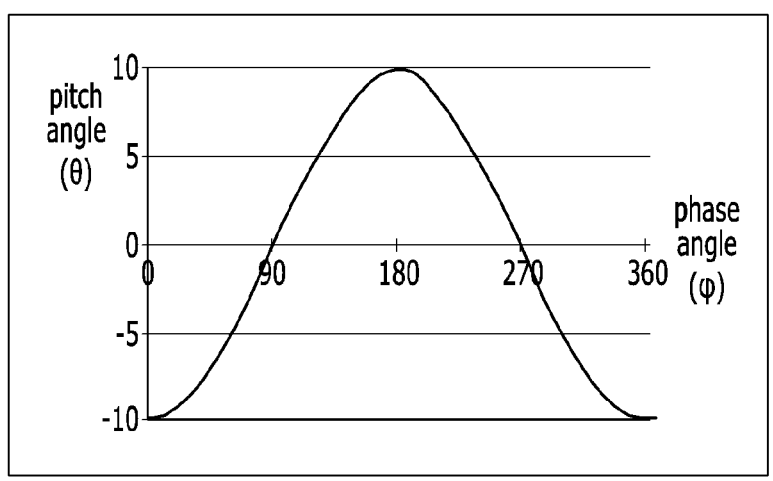
FIG. 3 is a graph showing that the pitch angles varied depending on the phase angle of the blade shown in FIG. 2, in the power generation mode.

FIG. 1 is a perspective view of a high-altitude wind power generation system according to an embodiment of the present invention, FIG. 2 is a view showing that a pitch angle is adjusted in accordance with a phase angle of the blades shown in FIG. 1, in a power generation mode, and FIG. 3 is a graph showing that the pitch angles varied depending on the phase angle of the blade shown in FIG. 2, in the power generation mode.

Referring to FIGS. 1 to 3, a high-altitude wind power generation system 100 according to an embodiment of the present invention includes a buoyant apparatus 10, a cycloidal turbine 20, and a motor-generator 30, as a high-altitude wind power generation system that generates power based on winds while staying at a high altitude of about 300 m to 500 m from the ground G.

The buoyant apparatus 10 is a nonrigid balloon manufactured by an airtight textile, a synthetic resin sheet or the like, which is inflated by injecting buoyancy generating gas having lower density than air therein. In this embodiment, the buoyant apparatus 10 employs a buoyant parafoil that can be folded when usually kept on the ground and have a cross-section shaped like an airfoil when inflated. In this embodiment, helium gas is used as the buoyancy generating gas.

The cycloidal turbine 20 gets a turning force for generating the wind power generation from winds W blowing from the front, or is forcibly rotated by receiving a driving force from the outside, thereby generating thrust or lift. The cycloidal turbine 20 is placed under the buoyant apparatus 10. The cycloidal turbine 20 includes a rotary shaft 21, a blade 22 and a support hub 23.

The rotary shaft 21 is arranged to be substantially horizontal to the ground G and substantially perpendicular to a direction of winds W blowing from the front. Further, the rotary shaft 21 is rotatable with respect to its center line C.

The support hubs 23 are a pair of disk members, which are spaced apart from each other and have respective center portions irrotationally coupled to opposite ends of the rotary shaft 21.

The support hub 23 includes a plurality of radial spokes 24 extended in a radial direction of the rotary shaft 21 and arranged at preset intervals along a circumferential direction of the rotary shaft 21.

The blade 22 has a cross-section shaped like an airfoil revolving around the rotary shaft 21, and includes blade supports 25 protruding at ¼ chords from opposite ends thereof.

The blade supports 25 are rotatably supported at the ends of the radial spokes 24, respectively, so that the plurality of blades 22 can be arranged at the preset intervals as being spaced apart from each other along the circumferential direction of the rotary shaft 21. Accordingly, the blades 22 are individually adjustable in pitch angle θ with respect to a virtual pitch center line P formed on ¼ chord. Here, the blades 22 have the same distance between the pitch center line P and the rotary shaft center line C.

The blade 22 is arranged so that the pitch center line P is long extended to be parallel with the rotary shaft center line C and substantially perpendicular to the flowing direction of the fluid, i.e., the direction of winds W blowing from the front.

The cycloidal turbine 20 is mounted with a pitch-angle control unit (not shown) for individually and automatically adjusting the pitch angle θ in accordance with the phase angle φ of the blade 22. The pitch-angle adjusting unit is publicly known to those skilled in the art and has been disclosed as the pitch controller 140 in Korean Patent Official Gazette (Inventors: Seung-jo, Kim, et. al, Registration No.: 10-0558462, and Application date: Oct. 9, 2003), and therefore detailed descriptions thereof will be omitted.

If the pitch angle control unit (not shown) is adjusted, as shown in FIGS. 2 to 5 the blade 22 can periodically have a preset angle θ at each position of phase angle φ, while rotating with respect to the rotary shaft 21.

Figure 4:
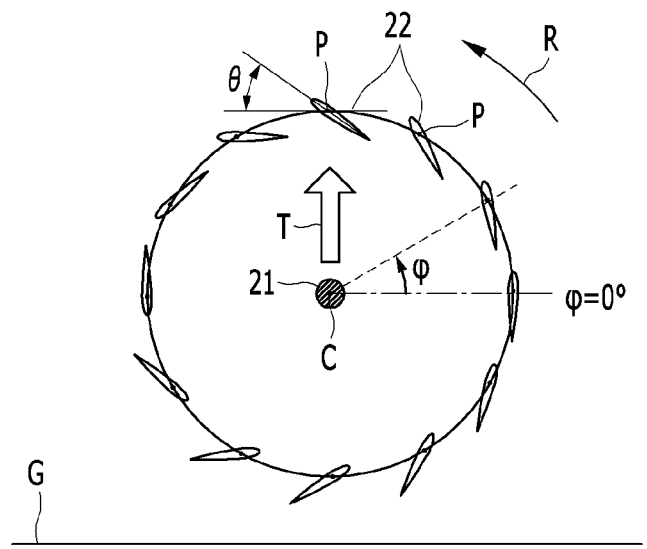
FIG. 4 is a view showing that the pitch angle is adjusted in accordance with the phase angle of the blades shown in FIG. 1, in the motor mode.
Figure 5:
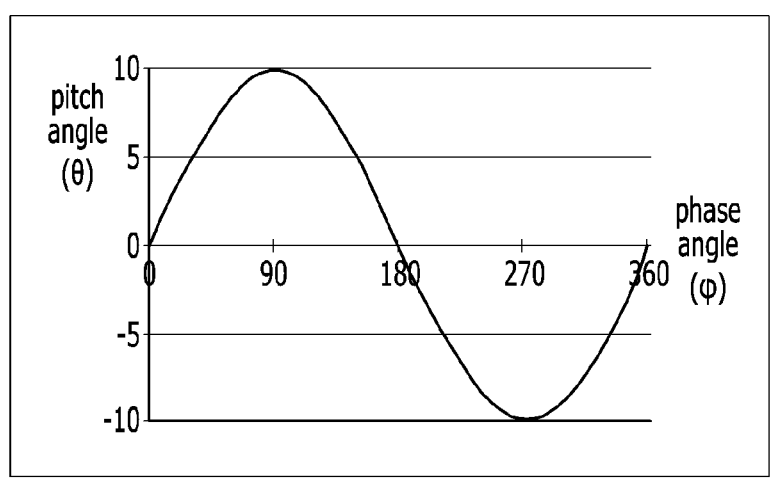
FIG. 5 is a graph showing that the pitch angles varied depending on the phase angle of the blade shown in FIG. 2, in the motor mode.
Figure 6:
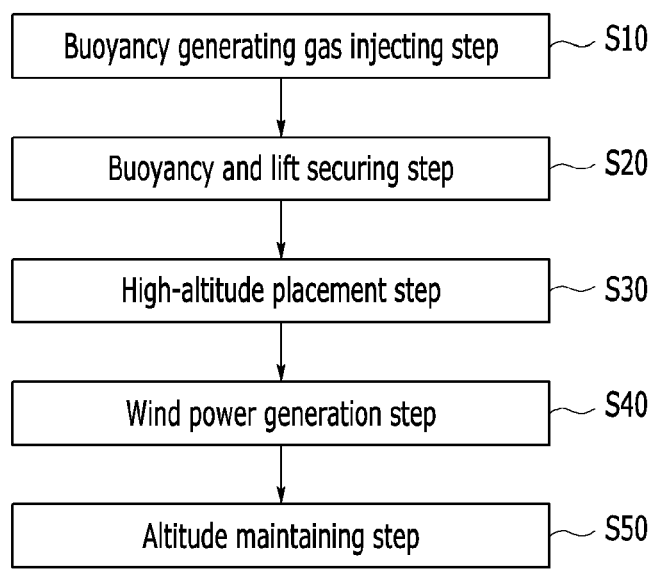
FIG. 6 is a flowchart for explaining a method of operating the high-altitude wind power generation system of FIG. 1.

The cycloidal turbine 20 has a pattern of the pitch angle θ corresponding to the phase angle φ of the blade 22 as shown in FIGS. 2 and 3 in the power generation mode where electricity is generated based on wind power, and has a pattern of the pitch angle θ corresponding to the phase angle φ of the blade 22 as shown in FIGS. 4 and 5 in the motor mode where the motor-generator 30 generates the driving force for the rotary shaft 21. Here, a point where the phase angle φ is 0° corresponds to a down stream of the winds W blowing from the front, and a point where the phase angle φ is 180° corresponds to an upper stream of the winds W blowing from the front.

In the power generation mode as shown in FIG. 3, the blade 22 has the maximum pitch angle θ at the point where the phase angle φ is 180°. In the motor mode as shown in FIG. 3, the blade 22 has the maximum pitch angle θ at the point where the phase angle φ is 90°. In this embodiment, the pitch angle θ of the blade 22 is adjusted so that thrust T generated in the motor mode can be aligned with the direction at φ=90°, i.e., so that only vertical lift T can be strictly generated in the motor mode.

The motor-generator 30 alternates between the power generation mode for generating the electricity and the motor mode for generating the driving force, and is provided as a pair of motor generators respectively connected to both ends of the rotary shaft 21 of the cycloidal turbine 20.

The motor-generator 30 receives a turning force from the rotary shaft 21 to perform wind power generation in the power generation mode, and transmits a rotation driving force to the rotary shaft 21 in the motor mode as being supplied with electricity from a battery (not shown) or the like external power source installed on the ground.

The pair of the motor-generators 30 have upper portions irrotationally respectively coupled to first coupling portions 14 formed opposite ends of an upper frame 12 having a 'U'-shape, and have lower portions irrotationally respectively coupled to second coupling portions 15 formed opposite ends of a lower frame 12 having a 'U'-shape.

The upper frame 12 and the lower frame 13 are arranged in the form of surrounding the cycloidal turbine 20 up and down when coupled to the motor-generator 30.

The buoyant apparatus 10 is connected to ripcord connecting portions 16 formed on top portions of the upper frame 12 through a plurality of ripcords 11.

A moorings connecting portion 17 is formed on a bottom portion of the lower frame 13, and connects with a first end of the mooring wire 40 having a second end fastened to the ground G.

The mooring wire 40 includes an electric wire (not shown) used for transmitting electricity generated by the motor-generator 30 to the ground, or transmitting the electricity for driving a motor from the ground to the motor-generator 30.

The second end of the mooring wire 40 is fastened to the ground G as being connected to a ground winch 50 fastened to the ground G.

The ground winch 50 refers to a winding machine that winds or unwinds the mooring wire 40 by an electromotive force. The ground winch 50 can firmly hold the second end of the mooring wire 40, so that the mooring wire 40 cannot be unwound from the ground witch 50 when it stops operating.

With the foregoing configuration, a method of operating the high-altitude wind power generation system 100 will be described below.

First, when helium gas is injected into the buoyant apparatus 10 on the ground, the buoyant apparatus 10 becomes inflated and has a cross-section shaped like an airfoil. Due to buoyancy based on difference in density between helium gas and the external air, the buoyant apparatus 10 rises from the ground G. As the buoyant apparatus 10 is lifted up from the ground G, the ripcord 11 becomes tightened and thus causes the cycloidal turbine 20 and the motor-generator 30 to become buoyant (a buoyancy generating gas step S10)

At this time, if winds W blow from the front, the cycloidal turbine 20, the motor-generator 30 and the like are additionally lifted by aerodynamic lift caused by the airfoil shape of the buoyant apparatus 10 and is then rising from the ground G. Here, if the buoyancy and the lift caused by the buoyant apparatus 10 are insufficient to lift up the cycloidal turbine 20, the motor-generator 30 and the like, the cycloidal turbine 20 may be driven in the motor mode, thereby additionally using the lift generated by the blade 22 (a buoyancy and lift securing step S20).

Then, the ground winch 50 operates to unwind the mooring wire 40 so that the buoyant apparatus 10 can continue to rise. When the buoyant apparatus 10 reaches a high-altitude of about 300 m to 500 m from the ground G, the ground winch 50 stops operating, thereby completely placing the high-altitude wind power generation system 100 at the high-altitude (a high-altitude placement step S30).

After the buoyant apparatus 10 is held to stay at a preset altitude and position, if it is determined that velocity of winds W blowing from the front is higher than a preset wind velocity $V_W$ to such an extent that the altitude of the buoyant apparatus 10 can be maintained, the pitch angle control unit (not shown) of the cycloidal turbine 20 is controlled to adjust the pitch angle θ of the blade 22 for the power generation mode where the electricity is generated by wind power as shown in FIGS. 2 and 3. Further, if the motor-generator 30 is set up for the power generation mode, the blades 22 are rotated forward in a rotational direction R by the winds W blowing from the front, and the rotary shaft 21 connecting with the blades 22 by the support hubs 23 is also rotated in the same rotational direction R. At this time, the motor-generator 30 connected to the rotary shaft 21 performs the wind power generation (a wind power generation step S40).

Meanwhile, while the foregoing wind power generation is performed, if the velocity of winds W blowing from the front becomes low, the lift of the buoyant apparatus 10 is decreased. Further, if the velocity of winds W blowing from the front is lower than the preset wind velocity $V_W$, only the buoyancy and the lift of the buoyant apparatus 10 are not enough to maintain the altitudes of the cycloidal turbine 20, the motor-generator 30 and the like. Therefore, at this time the pitch angle control unit (not shown) of the cycloidal turbine 20 is controlled to adjust the pitch angle θ of the blade 22 for the motor mode as shown in FIGS. 4 and 5. Further, the motor-generator 30 is set up for the power generation mode. Then, the driving force generated in the motor-generator 30 by the electricity supplied from the ground is transmitted to the rotary shaft 21 and forcibly rotates the blades 22, so that the vertical lift T can be generated, thereby preventing the cycloidal turbine 20, the motor-generator 30 and the like from descending and thus maintaining the preset altitude (an altitude maintaining step S50).

The foregoing steps may be automatically performed by various sensors (not shown) capable of sensing the velocity of winds W blowing from the front or sensing the altitude of the buoyant apparatus 10, and a controller (not shown) capable of automatically controlling the cycloidal turbine 20 and the motor-generator 30.

The high-altitude wind power generation system 100 with the foregoing configuration includes the cycloidal turbine 20 which includes the rotary shaft 21 arranged to be substantially horizontal to the ground G, and the plurality of blades 22 rotating with respect to the rotary shaft 21 while their pitch center lines P are parallel with the rotary shaft center line C; and the motor-generator 30 connected to the rotary shaft 21 of the cycloidal turbine 20, thereby having advantages of receiving the turning force from the rotary shaft 21 to generate power in the power generation mode, and transmitting the driving force of the motor-generator 30 to the rotary shaft 21 to generate the lift or the thrust in a motor mode.

Also, the high-altitude wind power generation system 100 includes the vertical-shaft type cycloidal turbine 20, of which the rotary shaft 21 is arranged to be substantially perpendicular to the direction of winds W blowing from the front, on the contrary to a conventional horizontal-shaft type, so that the radius of the blade 22 can be manufactured to be smaller than that of the conventional one with respect to the same power production, thereby having an advantage of reducing the total size of the system.

Further, the high-altitude wind power generation system 100 includes the vertical-shaft type cycloidal turbine 20, so that one pair of motor-generators 30 can be respectively mounted to both ends of the rotary shaft 21 as shown in FIG. 1, thereby having a symmetrical structure from side to side with respect to the mooring wire 40. Accordingly, the center of gravity of the cycloidal turbine 20 and the motor-generator 30 mounted to the buoyant apparatus 10 is advantageously aligned with the mooring wire 40, and therefore the high-altitude wind power generation system 100 has advantages that it is easy to mount the cycloidal turbine 20 and the motor-generator 30 to the buoyant apparatus 10 and the mooring wire 40 can be stably wound on or unwound from the ground winch 50.

Furthermore, on the contrary to the conventional horizontal-shaft type of which the blades are rotated at high velocity as being opened at the ends thereof, the high-altitude wind power generation system 100 has an advantage of being free from a safety accident that the blade 22 may hit the buoyant apparatus 10 or people, and the like since both ends of the blades 22 are closed by the support hubs 23.

Meanwhile, in the high-altitude wind power generation system 100, the buoyant apparatus 10 employs a buoyant parafoil that can be folded when usually kept on the ground and have a cross-section shaped like an airfoil when inflated. Advantageously, the high-altitude wind power generation system 100 can be easily kept since the buoyant apparatus 10 has a small volume when it is kept on the ground, and additionally lift up the cycloidal turbine 20 and the motor-generator 30 due to the aerodynamic lift caused by the airfoil shape of the buoyant apparatus 10. Therefore, as compared with a spherical balloon that cannot generate the aerodynamic lift, the high-altitude wind power generation system 100 can use the buoyant apparatus 10 having a smaller volume in order to make the same lift, thereby reducing a total manufacture cost.

Further, the high-altitude wind power generation system 100 includes the mooring wire 40 connected to the ground winch 50 fastened to the ground G, and it is thus convenient to make the buoyant apparatus 10 rise or descend through adjustment in length of the mooring wire 40 and also easy to hold the buoyant apparatus 10 to stay at a preset altitude and position.

Meanwhile, the method of operating the foregoing high-altitude wind power generation system has the advantages as follows. In the buoyancy and lift securing step S20, the motor-generator 30 operates in the motor mode so that the additional lift can be generated by the cycloidal turbine 20, thereby making the cycloidal turbine 20, the motor-generator 30 and the like easily rise even when the buoyancy and the lift of the buoyant apparatus 10 are not enough to lift up the cycloidal turbine 20, the motor-generator 30 and the like.

Also, the method of operating the high-altitude wind power generation system has the advantages as follows. The wind power generation step S40 is performed only when the velocity of the winds W blowing from the front is higher than the preset wind velocity $V_W$, and the altitude maintaining step S50 is performed to generate the additional lift through the cycloidal turbine 20 by using the motor generator 30 in the motor mode when the velocity of the winds W blowing from the front is lower than the preset wind velocity $V_W$. Therefore, it is possible to constantly maintain the altitude of the buoyant apparatus 10 even when the velocity of the winds W blowing from the front is lower than the preset wind velocity $V_W$ or when there is no wind blowing from the front.

In this embodiment, the pitch angle θ of the blade 22 is adjusted so that the thrust T generated in the motor mode can be aligned with the direction at φ=90°, i.e., so that only the vertical lift T can be strictly generated in the motor mode, but not limited thereto. Alternatively, the pitch angle θ of the blade 22 is adjusted so that the both the vertical lift and the forward and backward horizontal thrust can be generated at the same time. If the cycloidal turbine 20 generates the forward and backward horizontal thrust, it is advantageously possible to not only maintain the altitude of the buoyant apparatus 10 but also adjust the horizontal position of the buoyant apparatus 10.

Although some embodiments have been described herein with reference to the accompanying drawings, it will be understood by those skilled in the art that these embodiments are provided for illustration only, and various modifications, changes, alterations and equivalent embodiments can be made without departing from the scope of the present invention. Therefore, the scope and sprit of the present invention should be defined only by the accompanying claims and equivalents thereof.

The invention claimed is:

1. A high-altitude wind power generation system, which generates power based on wind power while staying at a high altitude, the system comprising:
   a buoyant apparatus configured to be inflated when buoyancy generating gas is injected therein;
   a cycloidal turbine configured to be placed under the buoyant apparatus, and comprise a rotary shaft arranged to be substantially horizontal to the ground, and a plurality of blades arranged along a circumferential direction of the rotary shaft while their pitch center lines are long extended to be parallel with a center line of the rotary shaft and are spaced apart from the rotary shaft at a preset distance as being arranged to be substantially perpendicular to a flowing direction of fluid blowing from a front, having pitch angles individually adjustable with respect to the pitch center line, and rotating with respect to the rotary shaft while their pitch center lines are being parallel with the center line of the rotary shaft; and
   a pitch angle control unit for adjusting the pitch angles of the plurality of blades, such that:
      when a velocity of wind blowing from a front of the cycloidal turbine is higher than a preset wind velocity, each blade has a negative pitch angle in an upper right sector and has a maximum pitch angle at a point where a phase angle of each blade is 180°; and
      when the velocity of the wind blowing from the front of the cycloidal turbine is lower than the preset wind velocity, each blade has a maximum pitch angle at a point where the phase angle of each blade is 90°; and
   a motor-generator connected with the rotary shaft of the cycloidal turbine, a center line of the motor-generator being arranged to maintain to be substantially perpendicular to the flowing direction of fluid blowing from the front, wherein:
      the motor-generator generates electricity from a mechanical rotational energy of the rotary shaft when the velocity of wind is higher than the preset wind velocity; and
      the motor-generator, when the velocity of wind is lower than the preset wind velocity, receives electricity from an external power source, generates a rotational driving force to be transmitted to the rotary shaft, and rotates each blade connected to the rotary shaft about the center line of the rotary shaft, so that each blade generates a vertical lift.

2. The system according to claim 1, wherein the cycloidal turbine comprises a pair of support hubs spaced apart from each other, having respective center portions coupled to opposite ends of the rotary shaft, and comprising a plurality of radial spokes extended in a radial direction of the rotary shaft, so that opposite ends of the blade can be respectively rotatably supported at ends of the radial spokes.

3. The system according to claim 1, wherein the buoyant apparatus comprises a buoyant parafoil having a cross-section shaped like an airfoil when inflated.

4. The system according to claim 1, further comprising a mooring wire, wherein a first end of the mooring wire is connected to the cycloidal turbine and a second end of the mooring wire is fastened to the ground.

5. The system according to claim 4, wherein the mooring wire is adjusted in length by a ground winch fastened to the ground.

6. A method of operating the high-altitude wind power generation system according to claim 1, the method comprising:
   a buoyancy generating gas injecting step of inflating the buoyant apparatus by injecting the buoyancy generating gas therein;
   a buoyancy and lift securing step of securing buoyancy generated by the buoyant apparatus and aerodynamic lift generated by the buoyant apparatus;
   a high-altitude placement step of placing the buoyant apparatus at a preset altitude and position; and a wind power generation step of generating electricity by operating the motor-generator to generate electricity from the mechanical rotational energy of the rotary shaft.

7. The method according to claim 6, wherein in the buoyancy and lift securing step, the motor-generator receives electricity from the external power source and generates the rotational driving force to be transmitted to the rotary shaft of the cycloidal turbine.

8. The system according to claim 1, when a velocity of wind blowing from a front of the cycloidal turbine is higher than a preset wind velocity, each blade is adjusted to have the pitch angle of 0° at a point where a phase angle of each blade is 90°.

* * * * *